July 14, 1959
R. M. FOX
2,894,302
SPRING CLIP
Filed Sept. 20, 1956
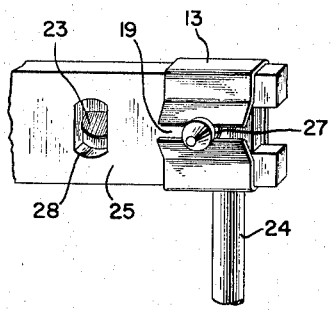
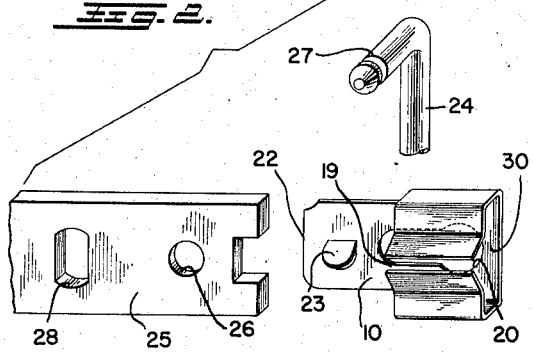
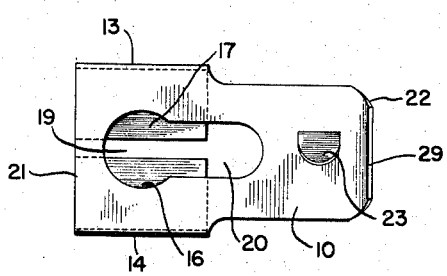
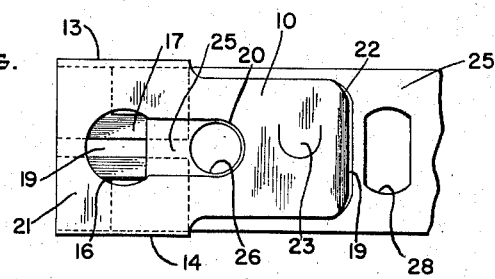
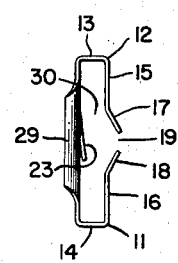
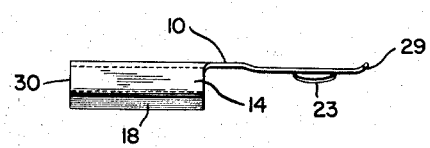
INVENTOR
ROBERT M. FOX
BY *G. L. all Matt*
ATTORNEY

2,894,302

SPRING CLIP

Robert M. Fox, Detroit, Mich., assignor to General Motors Corporation, Detroit, Mich., a corporation of Delaware Application September 20, 1956, Serial No. 611,035

3 Claims. (Cl. 24—73)

This invention relates to spring clips and more particularly to spring clips adapted to join a rod-like element to a substantially flat element. One use for which the clip is well adapted, although by no means limited, is to secure a connecting rod between a remote control element such as a garnish mold button or inside door handle of an automobile to the actuating levers of a door latch mechanism.

An object of this invention is to provide a spring clip that will secure a connecting rod element to a substantially flat element by simply sliding the clip to its holding position and then inserting the rod through an appropriate aperture in the flat element.

Another object is to provide a spring clip that, in areas of limited accessibility, may be easily moved to facilitate disassembly of the rod and lever elements. This can be done without damaging the clip. Thus the clip may be reused if desired.

Other objects of the invention inherent in the invention will be apparent from the following description with reference to the accompanying drawings which show the invention in its preferred form.

In the drawings:

Figure 1 is a perspective view illustrating the flat element, rod element and spring clip in their final assembled positions;

Figure 2 is an exploded view of Figure 1;

Figure 3 is a bottom plane view of a spring clip embodying the invention;

Figure 4 is an end view of the spring clip of Figure 3;

Figure 5 is a side view of the clip, and

Figure 6 is a bottom plane view illustrating the flat element and spring clip in their partially disassembled positions.

The clip as shown in Figures 3, 4 and 5 comprises a base section generally denoted by reference numeral 10 and a plurality of projections of appropriate configuration. This base as shown is substantially rectangular in shape but it is understood that other polygonal shapes may be used, and it may be fabricated from spring steel or any other suitable material that will provide a sufficiently strong connection.

The base section 10 is provided with arm members 11 and 12 including the upwardly standing portions 13 and 14 depending from opposite sides of and adjacent one end 21. The arms are further provided with inwardly bent portions 15 and 16 which overlie a portion of and are substantially parallel with the base sections. The ends of the inwardly bent portions 15 and 16 are spaced and thus define a slit 19. Although it is not necessary in practicing the invention, the inwardly bent portions 15 and 16 may terminate in diagonally and upwardly bent portions 17 and 18 adjacent the aforesaid slit 19. As shown in the drawings the arms 11 and 12 and the underlying base define a box-like space 30 into which the actuating lever 25 fits when it is assembled with the clip. The base section 10 is further provided with a slot 20 of a width slightly greater than the diameter of the rod to be joined and partially underlying the inwardly bent portions 15 and 16 and aligned with the slit 19. As shown in the drawings, the slot may be enlarged at the end underlying the inwardly bent portions 15 and 16 but the enlargement is not necessary to practice the invention. The slot also extends into the base section 10 not underlying the inwardly bent portions 15 and 16. The longitudinal length of the uncovered portion of the slot must be greater than the diameter of the rod to be joined to permit assembly and disassembly. The slot 20 as shown in the drawings is substantially parallel with the sides from which the arms 11 and 12 depend. Adjacent the other end 22 of the base section 10 is an upwardly bent tang 23 pressed or punched from it. The drawings show the tang 23 located between the exposed end of the slot 20 and the end 22 of the base section 10; however, it will be obvious later that the tang 23 may be located elsewhere on the base section 10. The end 22 of the base section 10 terminates in a downwardly bent or curled portion 29, the purpose of which will be obvious further on in the specification.

Figure 1 discloses the clip joining the remote control rod 24 to an actuating lever 25 which may, for example, be that of an automobile door latch. As shown in the drawing, the lever 25 fits within the box-like space 30 defined by the arms 11 and 12 and the underlying base section 10, and is slidably embraced therein. The lever 25 is provided with an aperture 26 of slightly greater diameter than the rod 24. The aperture 26 is aligned with the slit 19 and the covered part of the slot 20, when the lever 25 is assembled with the subject spring clip. The lever 25 is further provided with an identation or aperture 28 into which the aforesaid tang 23 projects to prevent inadvertent movement of the clip when it is in the assembled position. The rod 24 is provided with an annular groove 27 of an appropriate diameter that will permit it to slide longitudinally along the slit 19 and, at the same time, the grooved portion 27 cooperates with the ends of the inwardly bent portions 15 and 16 to prevent movement of the rod in a direction normal to the inwardly bent portions.

The rod, lever and clip may be assembled by inserting the free end of the lever 25 into box-like space 30 until (Fig. 6) the covered portion of the slot 20 is aligned with the aperture 26, and the tang 23 projects into the aperture 28 and prevents inadvertent movement of the clip after it is in the assembled position. The rod 24 may now be inserted through the slot 20 and the aperture 26. The end of the rod 24 will spread the slit 19, and further insertion of the rod 24 will cause the upwardly bent portions 17 and 18 to snap into the annular groove 27. The rod 24 is now secured by the engagement of the groove 27 and the ends of the inwardly bent portions 15 and 16. If it should be desired to remove the clip any flat prying instrument such as a screwdriver may be inserted under the curled portion 29 to disengage the tang 23 from the aperture 28. The clip may then be slid backward to disengage the ends of the inwardly bent portions 15 and 16 from the groove 27. The rod is then free to be withdrawn from the aperture 26 and the uncovered portion of the slot 20. It is obvious from the aforesaid description that the clip is easily slid in confined areas and the clip is not damaged in either assembly or disassembly and may be reused if desired.

While the embodiment of the invention as herein discussed constitutes a preferred form it is to be understood that other forms might be adopted as may come within the scope of the claims.

What is claimed is:

1. A fastening device comprising in combination, a flat elongated base section, two arms upwardly standing from opposite sides and adjacent one end of said base section, said arms being inwardly bent toward each other, ends of the inwardly bent portions of said arms being in closely spaced relationship, said base section being provided with a slot substantially parallel with said sides and partially underlying the inwardly bent portions and aligned with the space therebetween, a resilient tang upwardly standing from said base section adjacent the other side of said base section, a substantially flat member containing a slot and a perforation, said slot receiving the resilient tang on said base section, and a rod-like member inserted through said perforation of said flat member, the slot on said fastening device and between the two upwardly extending arms on said fastening device.

2. A spring clip for connecting a plurality of links comprising an elongated base section, a pair of depending arms extending from opposite side edges of said base section adjacent one end thereof, a longitudinal slot in said base section extending from a point between to a point beyond said arms, said arms being bent toward each other to define a retaining space for a first linking member, the ends of said inwardly bent arms being in closely spaced relationship to define an elongated slit adapted to receive and pivotally secure a second linking member extending transversely through the first linking member and said slot, said slot and said slit being substantially aligned so that the clip may be slidably disconnected, and tang means provided on said base section engageable with one of said links to prevent inadvertent movement of the clip in its assembled position.

3. The spring clip as described in claim 2 wherein an edge of said base section is curled to provide a seat for a tang means disengaging tool.

References Cited in the file of this patent

UNITED STATES PATENTS 2,636,235    Nygard  ---------------- Apr. 28, 1953